(12) United States Patent
Dodson et al.

(10) Patent No.: US 7,716,732 B2
(45) Date of Patent: May 11, 2010

(54) SECURE ONLINE REPOSITORY

(75) Inventors: Jon R. Dodson, Lampasas, TX (US);
Paul D. Kenley, Lampasas, TX (US)

(73) Assignee: Vital Life Link, Inc., Lampasas, TX (US)

( * ) Notice: Subject to any disclaimer, the term of this patent is extended or adjusted under 35 U.S.C. 154(b) by 1118 days.

(21) Appl. No.: 11/136,614

(22) Filed: May 24, 2005

(65) Prior Publication Data

US 2006/0271543 A1 Nov. 30, 2006

(51) Int. Cl.
*G06F 7/04* (2006.01)

(52) U.S. Cl. .............................. 726/17; 726/2; 726/16; 707/9

(58) Field of Classification Search ........................ None
See application file for complete search history.

(56) References Cited

U.S. PATENT DOCUMENTS

2001/0039504 A1* 11/2001 Linberg et al. .................. 705/3
2002/0111946 A1* 8/2002 Fallon ............................ 707/9

OTHER PUBLICATIONS

"MyHealth Directive.com: Home," http://www.myealthdirective.com/index.jsp, printed Feb. 6, 2006.
"MyHealth Directive.com: How MyHealthDirective.com Works," http://www.myhealthdirective.com/page_server/HowMHDWorks/How%20MyHealthDirective%20Works.html, printed Feb. 6, 2006.
"MyHealth Directive.com: What is an AHD?," http://www.myhealthdirective.com/page_server/ HowMHDWorks/What%20Is%20an%20AHD.html, printed Feb. 6, 2006.
"MyHealth Directive.com: How the System Works," http://www.myhealthdirective.com/page_server/HowMHDWorks/How%20the%20System%20Works.html, printed Feb. 6, 2006.
"MyHealth Directive.com: How to Register an AHD," http://www.myhealthdirective.com/page_server/HowMHDWorks/How%20to%20Register%20an%20AHD.html, printed Feb. 6, 2006.
"MyHealth Directive.com: How to View Your AHD," http://www.myhealthdirective.com/page_server/HowMHDWorks/How%20to%20View%20Your%20AHD.html, printed Feb. 6, 2006.
"MyHealth Directive.com: How to Change Your AHD," http://www.myhealthdirective.com/page_server/HowMHDWorks/How%20to%20Change%20Your%20AHD.html, printed Feb. 6, 2006.
"MyHealth Directive.com: Families & Individuals," , http://www.myhealthdirective.com/page_server/Families/Families%20and%20Individuals.html, printed Feb. 6, 2006.
"MyHealth Directive.com: Talk About It," http://www.myhealthdirective.com/page_server/Families/Talk/Talk%20About%20It.html, printed Feb. 6, 2006.

(Continued)

*Primary Examiner*—Pramila Parthasarathy
(74) *Attorney, Agent, or Firm*—Ostrow Kaufman & Frankl LLP (57) ABSTRACT

Techniques for secure online storage. A user is registered for securely storing documents on a network. User documents are stored on a network server. The user documents include documents for disposing of user property after death or for effecting user medical decisions. A secure network interface is provided for displaying the user documents remotely upon receiving a user security identifier. A secure network interface is provided for displaying the user documents remotely to authorized medical personnel who do not have access to the user security identifier.

19 Claims, 3 Drawing Sheets

OTHER PUBLICATIONS

"MyHealth Directive.com: Putting Things in Order," http://www.myhealthdirective.com/page_server/Families/Order/Putting%20Things%20in%20Order.html, printed Feb. 6, 2006.

"MyHealth Directive.com: Compassionate Care," http://www.myhealthdirective.com/page_server/Families/Care/Compassionate%20Care.html, printed Feb. 6, 2006.

"MyHealth Directive.com: Caregiver Support," http://www.myhealthdirective.com/page_server/Families/Caregiver/Caregiver%20Support.html, printed Feb. 6, 2006.

"MyHealth Directive.com: Ask a Doctor," http://www.myhealthdirective.com/page_server/Families/AskDoctor/Ask%20a%20Doctor.html, printed Feb. 6, 2006.

"MyHealth Directive.com: Ask an Attorney," http://www.myhealthdirective.com/page_server/Families/AskAttorney/Ask%20an%20Attorney.html. printed Feb. 6, 2006.

"MyHealth Directive.com: Religious Perspectives," http://www.myhealthdirective.com/page_server/Families/Religion/Religious%20Perspectives.html, printed Feb. 6, 2006.

"MyHealth Directive.com: For Employers," http://www.myhealthdirective.com/page_server/Employers/For%20Employers.html, printed Feb. 6, 2006.

"MyHealth Directive.com: Sponsor Five Wishes Plus," http://www.myhealthdirective.com/page_server/Employers/Sponsor%20Five%20Wishes%20Plus.html, printed Feb. 6, 2006.

"MyHealth Directive.com: Develop a Program," http://www.myhealthdirective.com/page_server/Employers/Develop%20a%20Program.html, printed Feb. 6, 2006.

"MyHealth Directive.com: Grief Guides," http://www.myhealthdirective.com/page_server/Employers/Grief%20Guides.html, printed Feb. 6, 2006.

"MyHealth Directive.com: Resource Links," http://www.myhealthdirective.com/page_server/Employers/Resource%20Links.html, printed Feb. 6, 2006.

"MyHealth Directive.com: Select a State," http://www.myhealthdirective.com/page_server/Home/Select%20State.html, printed Feb. 6, 2006.

"MyHealth Directive.com: Five Wishes Plus," http://www.myhealthdirective.com/page_server/FiveWishes/Five%20Wishes.html, printed Feb. 6, 2006.

* cited by examiner

SECURE ONLINE REPOSITORY

BACKGROUND OF THE INVENTION

1. Field of the Invention

The present invention relates generally to the storage of information on a network. More particularly, it concerns a secure, online depository for documents such as, but not limited to, those dealing with the disposition of property after death and the execution of medical decisions.

2. Description of Related Art

The effective management of important information and documents can be of utmost importance as evidenced by the recent Terry Schiavo case, where a dispute arose about the end-of-life wishes of Ms. Schiavo. Ms. Schiavo was in a vegetative state for years and apparently did not possess a living will or a similar document that would provide guidance about medical decisions. The public and the judicial, congressional, and executive branches of government became embroiled in a bitter debate about whether Ms. Schiavo's feeding tube should be removed. The debate could have been avoided if Ms. Schiavo's wishes were recorded and maintained in a manner allowing for access by, e.g., medical personnel. Unfortunately, the Schiavo case ended sadly-she was allowed to pass away while lingering questions remained about whether her wishes were indeed respected.

While not as dramatic as the Schiavo case, other shortcomings associated with the maintenance of information and documents abound. It is common for loved ones not to know about end-of-life decisions of a living, or deceased individual. For example, it is common that family members will not know whether a deceased family member (a) had a will, (b) where such a will is/would be located, (c) had any real estate or other not-so-apparent possessions, (d) had any not-so-apparent debts or other end-of-life responsibilities, or (e) had any specific funeral wishes. Likewise, if tragedy strikes a family member, it is common for there to be questions about whether a living will exists and where it is located, whether there is a medical power of attorney, etc. Problems such as these can be exasperated when one travels or when one is admitted into a medical facility that is far away or new to a family.

Safety deposit boxes attempt to address some of these problems by offering a place where important documents can be locked away. However, access to needed information in a timely manner is problematic when the safety deposit box is the sole repository of vital information. The safety deposit box, while secure, is very much "out of sight, out of mind." Consequently, individuals tend to forget to update it when life situations change, and in many cases, vital information is so out of date as to lose its relevance to a current emergency situation. If an emergency arises or if one is located away from a safety deposit box, it is difficult if not impossible to access its contents. For example, if a hospital requires a copy of a medical directive in a time of emergency, a safety deposit box is of little help. Similar problems exist for any physical safekeeping location for documents and information.

Shortcomings mentioned above are not intended to be exhaustive, but rather are among many that tend to impair the effectiveness of previously known techniques concerning the handling of important information and documents. At least because the methodologies previously known in the art have not been altogether satisfactory, a significant need exists for the techniques described and claimed in this disclosure.

SUMMARY OF THE INVENTION

Certain shortcomings of the prior art may be reduced or even eliminated by the techniques disclosed here. These techniques are applicable to a vast number of applications, including but not limited to applications involving the storage of end-of-life and medical-decision documents and information.

In one respect, the invention involves a method. A user is registered for securely storing documents on a network. User documents are stored on a network server. The user documents include documents for disposing of user property after death or for effecting user medical decisions. A secure network interface is provided for displaying the user documents remotely upon receiving a user security identifier. A secure network interface is provided for displaying the user documents remotely to authorized medical personnel who do not have access to the user security identifier. The user documents may include, e.g., wills, living wills, medical directives, powers of attorney, organ donation documents, and documents reflecting the location or nature of user property to be disposed of after death. The user documents may include other documents as well such as funeral wishes. The user documents may reflect personal biographical data, business data, banking data, or user property data. The network server may include an internet server, and the secure network interface may include an internet browser. The user security identifier may include a password. The user security identifier may include biometric information. The biometric information may include information such as fingerprint information, retina information, voice information, face information, and handwriting information. Providing a secure network interface for displaying the user documents remotely to authorized medical personnel may involve providing the medical personnel with an override security identifier. Providing a secure network interface for displaying the user documents remotely to authorized medical personnel may involve providing the medical personnel with a secure mechanism for looking up the user security identifier. The method may also include providing the user with periodic alerts reminding the user to update or confirm information reflected in the user documents. The method may also include providing the user with periodic alerts concerning news, developments, or advice about end-of-life issues. The method may also include: storing informal user comments for disposing of user property after death or for effecting user medical decisions; providing a secure network interface for displaying the user comments remotely upon receiving a user security identifier; and providing a secure network interface for displaying the user comments remotely to authorized medical personnel who do not have access to the user security identifier. The method may also include providing a printout of the user documents to the authorized medical personnel. The printout may include a certification including information selected from the group consisting of: printing date, printing time, printing location, user identifier, printing party identifier, and server identifier. Information may be encrypted as a security measure.

In another respect, the invention involves a computer readable media including computer executable instructions. The instructions: register a user for securely storing documents on a network; store user documents on a network server, the user documents including documents for disposing of user property after death or for effecting user medical decisions; interact with a secure network interface for displaying the user documents remotely upon receiving a user security identifier; and interact with a secure network interface for displaying the user documents remotely to authorized medical personnel who do not have access to the user security identifier. The media may also include instructions for providing the user with periodic alerts reminding the user to update or confirm information reflected in the user documents The media may also include instructions for providing the user with periodic alerts concerning news, developments, or advice about end-of-life issues. The media may also include instructions for encrypting information as a security measure.

In another respect, the invention involves a system including a network server having a processor that is configured to: register a user for securely storing documents on a network; store user documents on a network server, the user documents including documents for disposing of user property after death or for effecting user medical decisions; interact with a secure network interface for displaying the user documents remotely upon receiving a user security identifier; and interact with a secure network interface for displaying the user documents remotely to authorized medical personnel who do not have access to the user security identifier.

The term "document" is defined as any writings, drawings, graphs, charts, photographs, phonorecords, and other data compilations from which information can be obtained, translated, if necessary, by a person through detection devices into reasonably usable form.

The term "secure" is defined according to its plain meaning to those of ordinary skill in the art and encompasses, in different embodiments, security arising from techniques such as authentication, encryption, or other types of control used to isolate information from the public or to protect against unauthorized access or operation.

The term "security identifier" is defined to be any one or more identifiers (e.g., an alphanumeric string, a signal, bits of information) such as a password, PIN, or biometric information (e.g., fingerprint, retina scan, voice recognition, face recognition, handwriting recognition etc.) allowing one to access a secure system. In different embodiments, a user name or number plus a password may collectively make up a security identifier.

The term "medical personnel" is defined according to its plain meaning to those of ordinary skill in the art and encompasses, in different embodiments, emergency personnel and assistants who perform or facilitate medical activities (e.g., paramedics, fire-department rescue teams, ambulance workers, etc.), medical practitioners and assistants, nurses and assistants, doctors and assistants, medical clerks and assistants, medical insurance personnel and assistants, etc.

The terms "a" and "an" are defined as one or more unless this disclosure explicitly requires otherwise.

The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a method or device that "comprises," "has," "includes" or "contains" one or more steps or elements possesses those one or more steps or elements, but is not limited to possessing only those one or more elements. Likewise, a step of a method or an element of a device that "comprises," "has," "includes" or "contains" one or more features possesses those one or more features, but is not limited to possessing only those one or more features. Furthermore, a device or structure that is configured in a certain way is configured in at least that way, but may also be configured in ways that are not listed.

Other features and associated advantages will become apparent with reference to the following detailed description of specific, example embodiments in connection with the accompanying drawings.

BRIEF DESCRIPTION OF THE DRAWINGS

The following drawings form part of the present specification and are included to further demonstrate certain aspects of the invention. The drawings do not limit the invention but simply offer examples.

DESCRIPTION OF ILLUSTRATIVE EMBODIMENTS

The description below is directed to specific embodiments, which serve as examples only. Description of these particular examples should not be imported into the claims as extra limitations because the claims themselves define the legal scope of the invention. With the benefit of the present disclosure, those having ordinary skill in the art will comprehend that techniques claimed and described here may be modified and applied to a number of additional, different applications, achieving the same or a similar result. The attached claims cover all such modifications that fall within the scope and spirit of this disclosure.

Embodiments of this disclosure involve techniques that vastly improve how individuals from all across the world can access their personal and business information from any location. In one embodiment, an encrypted web site allows individuals, couples, families, and anyone else who desires to participate an opportunity to list in written form any final wishes for disposition of property and other matters after death has occurred. For example, individuals may securely store funeral wishes for others to view and consider at the appropriate time.

Since our society is now so mobile, people typically do not carry their most important and valuable information with them twenty-four hours per day, three-hundred-sixty-five days per year. Techniques disclosed here, however, provide a user (and others, if authorized) access to this information whenever the need arises through an encrypted web site from a location as near as the nearest Internet or other network connection. Stored information can be in text or other form to allow for slow network connections (e.g., dial-up connections) to access the information. Within the secure environment, users can store a myriad of information such as that relating to personal and business matters, which may be retrieved at a later date and time by accessing a network through any appropriate means (e.g., via an Internet browser). Information may be sent or viewed over the network through any appropriate means (e.g., Internet browser, e-mail, facsimile, regular mail, etc.). Users may choose to store personal biographical data, banking information, insurance information, property information, business information, the location of business items, legal forms, legal documents, etc. Other noteworthy information such as that which is useful for decision-making (e.g., end-of-life or medical decisions) may be included in the user's storage. Users may modify or personalize stored information for a variety of reasons. Modifications may even be encouraged each time one's personal or business information changes. In one embodiment, modification of information requires only a simple update of a user profile, and the ease of this process may encourage individuals to keep information up-to-date. Requests that are unique to the user, or of a more general nature, may be recorded.

Having securely stored information on a network in accordance with the techniques described here, the user may provide medical personnel with a reliable, first place to search for personal data or other important information should a need arise. For example, information about organ donation, emergency contact information, medical directives, etc. can be determined by medical personnel, if needed, very quickly. Likewise, personal vital statistics, last wishes, final arrangements, funeral wishes, medical directives to physicians in or out of a medical facility, living wills, personal wills, powers of attorney, next of kin, and other information of a personal or business nature may be conveniently and securely retrieved.

Hand-signed documents may be scanned and stored electronically. In one embodiment, users may use a scanning/digitizing service to accomplish this. Information in any language may be stored. In one embodiment, systems implementing the techniques of this disclosure may also assist a user in obtaining relevant forms for a given purpose and printing those forms. For example, forms addressing common issues may be stored for user download (e.g., form wills, form directives, form power of attorney, form funeral wishes, etc.). Following downloading and printing, the user may have the forms properly signed and may return them for scanning into the secure storage.

The amount and type of security surrounding the storage of information may vary, but in preferred embodiments, information entrusted for storage would, at no time, be shared, traded, and or sold to another entity without authorization. In preferred embodiments, information contained within documents would remain strictly confidential and solely the property of its rightful owner.

Figure 1:
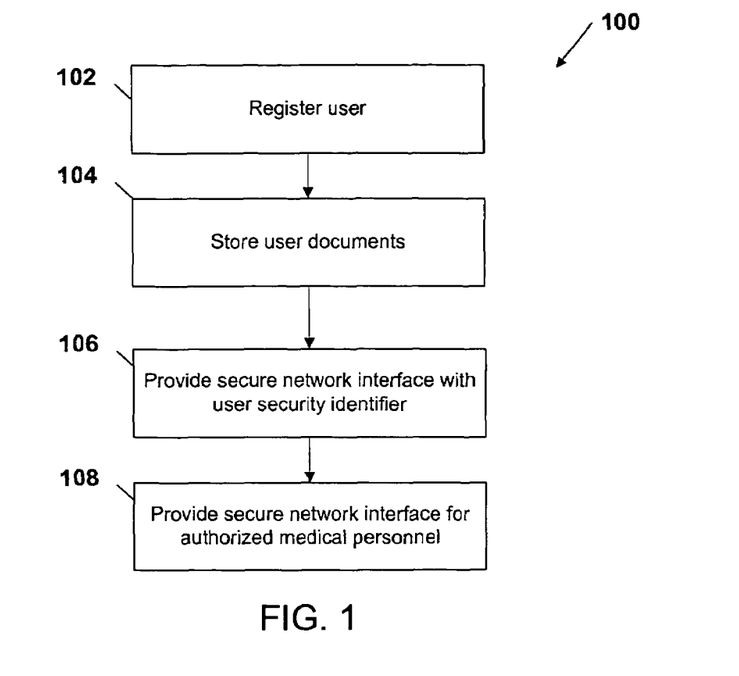
FIG. 1 is a flowchart showing an example method in accordance with embodiments of the present disclosure.

FIG. 1 is a flowchart showing an example method 100 in accordance with embodiments of the present disclosure. In step 102, a user is registered for securely storing documents on a network. Registration itself may take one of many forms known in the art. In one embodiment, a user may register for storage by logging onto a web site that allows a user to register online by entering personal, financial and/or other information. In another embodiment, registration may be done in person in front of a representative. The representative may take down the information necessary to set up a user account. In another embodiment, registration may be done via a paper application mailed to a potential user and back to a receiving office.

During registration, obtained personal information may be used to identify the user setting up an account. For example, a user's name, address, phone number, and e-mail address may be required. More detailed information such as date of birth, driver's license number, social security number, information regarding family and relatives, etc. may also be obtained.

Financial information may be required during registration so that payment may be secured for the service of securely storing documents. For example, a user may be asked for credit card or bank routing information. In different embodiment, services associated with the techniques of this disclosure may incur a weekly, monthly, yearly, or one-time charge to a user. Techniques of this disclosure may therefore be set up as a subscription service.

Charges may vary according to the amount of storage space consumed by a user. Charges may vary according to the level of service provided (e.g., a higher charge may be associated with a user account which sends more frequent reminders or useful information to users or which allows users to update information more frequently). Different levels of service may be assigned different categories. For example, a "standard" user may be entitled to X amount of storage, Y free updates to information per year, and Z reminders or other useful transmittals regarding the account. A "Tier 2" user may be entitled to more than X amount of storage, more than Y free updates, and more than Z reminders/transmittals. Of course, more tiers may be added in such embodiments with various combinations of services and relative benefits. Service fees may be automatically withdrawn using the user's financial information provided during registration or received by other means (e.g., a user may mail subscription fees). In embodiments in which techniques of this disclosure are provided for free, the gathering of user financial information may not be necessary. In such embodiments, revenue may be secured, if desired, through the use of, e.g., banner advertisements that are displayed on user accounts. Such embodiments are presently not-preferred, but may afford some users with an opportunity to use these services who would not be able to otherwise afford them.

Other information may be gathered during a registration process. For example, medical information associated with a user may be gathered. In one embodiment, a user's medical insurance policy information is obtained during registration. Additionally, registration may entail an identification of medical personnel who may be associated with the user's preferred, nearby, or expected healthcare facilities. An identification of remote medical facilities may also be gathered. For example, if a user knows that he or she will be traveling to a distant city, one or more medical personnel or medical facilities may be identified in that city. Such information, as will be discussed below, may allow for the provision of access to securely stored documents to select medical personnel in different embodiments.

In one embodiment, during or after registration, a user may be allowed to choose, or be assigned, a user security identifier, which will allow the user access to services of this disclosure. In a preferred embodiment, the user security identifier may include a user name or number plus a password. In one embodiment, information involving an e-mail address, social security number, a physical address, or the like may make up all or part of a user name or number so that it is easier to remember. In a preferred embodiment, the user security identifier also includes a password. In other embodiments, suitable user security identifiers can include, but are not limited to, biometric information such as fingerprint information, retina information, voice information, face information, or handwriting information.

In step 104, user documents are stored. In preferred embodiments, the user documents are stored on an Internet server. In preferred embodiments, the user documents include, but are not limited to, documents for disposing of user property after death or for effecting user medical decisions. For example, wills, living wills, directives, powers of attorney, and the like may be stored. The actual storage of documents may be accomplished according any number of methods known in the art. For example, documents may be uploaded over a network for storage on a server or other storage device. Documents may be sent via a file transfer protocol (FTP). Documents may be e-mailed to a particular address. Documents may be mailed (via traditional mail such as the U.S. Postal Service, Federal Express, etc.) on a data storage device such as, but not limited to, a CD, a DVD, a floppy disk, a rigid disk (e.g., ZIP™ disk), a tape, a FLASH device, a hard drive, etc.). Documents may be hand delivered to a service. To facilitate easy transfer of documents, a user's machine may be configured to effect convenient uploads. In embodiments utilizing an Internet browser, a small utility may be installed onto a user's browser so that it may easily and securely upload documents to the storage center.

In one embodiment, documents from users are stored on one or more network servers. Due to the importance of the documents, various archiving or disaster recovery techniques may be used to ensure that documents are not lost and kept safe. For example, RAID techniques may be used. Various security techniques may be employed to ensure that such servers are not compromised. Different media may be used for document storage, as will be understood by those of ordinary skill in the art having the benefit of this disclosure.

In one embodiment, users may additionally enter information such as informal user comments, which are stored alongside of the other user documents. For example, one may input informal wishes related to any number of topics such as, but not limited to, funeral wishes, the disposition of user property after death, or user medical decisions. This ability may encourage users to enter their wishes even if they are not willing to go to a lawyer to have a more formal document drafted. It may also encourage users to more willingly or freely express their end-of-life decisions.

In step 106, a secure network interface is provided for displaying user documents remotely upon receiving the user security identifier. In preferred embodiments, the secure user interface is an Internet browser configured to display secure information. For example, a browser may be used that is configured to work with HTTPS, which is the secure version of HTTP, the communication protocol of the Internet. HTTPS can provide authentication and encrypted communication. HTTPS is typically used on commercial web sites such as those offering goods for sale and accepting customer credit card information. Generally, HTTPS encrypts data using either a version of a SSL (Secure Socket Layer) protocol or a TLS (Transport Layer Security) protocol. This, in turn, ensures protection from unauthorized access. Different levels of protection may be achieved, as is known in the art using HTTPS and similar techniques. In web pages that use HTTPS, the URL typically begins with "https://" instead of http://."

In one embodiment, the secure network interface may be configured to allow a user to only view documents. In other embodiments, a user may be allowed to save a copy of the document to a local storage media and/or print the document. These different types of access options may depend on the identity of the user. For example, "standard" users may have different accessibility options than "Tier 2" users. Medial personnel accessing a document (discussed below) may have a different level of accessibility than a typical subscription user.

In embodiments in which a printout of a document is allowed, that printout may include some type of certification. For example, a printout may include a printing date, printing time, printing location, user identifier, printing party identifier, and/or server identifier. Such information may be helpful in authenticating or otherwise tracking a printout. Such information may be formatted as known in the art. For example, certification information may appear as a header, footer, watermark, etc.

In a preferred embodiment, the secure network is interface is provided upon entry of a user security identifier. For example, a user may enter a user name followed by a password. Alternatively, a user may provide a fingerprint or other biometric information. Entry of this information may "log on" the user onto a secure interface that allows the user to retrieve and view important documents.

A user need not be the owner of the documents. In one embodiment, the user may be anyone who is authorized to access the documents. Authorization may entail simply informing a family member or another trusted person a particular user security identifier. If the entrusted person is later not wished to have access to stored documents, the user security identifier may be changed. In one embodiment, a second, separate user security identifier may be required to change the "main" user security identifier. Such an embodiment would allow for an authorized person to view documents but not to change user profile settings. In other embodiments, even additional, separate security identifiers may be used similarly.

In another embodiment, authorization may be given to others by setting up additional user names or numbers with user security identifiers for a single account. For example, an account housing documents may have associated with it several user security identifiers corresponding to, e.g., different members of a family. Each user may have different access rights, as defined by the account owner (or administrator). In one embodiment, a unique system of security identifiers, which will work on the same order as a master key system providing limited access to rooms in a building, may be employed to allow a subscriber to dictate precisely which individuals or emergency response entities may have access to stored information. Subscription services may be priced according to the number of assigned security identifiers.

In step 108, a secure network interface is provided for authorized medical personnel who do not have access to a user's security identifier. This allows such medical personnel to access stored documents. This step is similar to step 106, but here, a medical personnel is provided access despite the fact that he or she does not know a user security identifier for a particular person (e.g., for a patient). Despite this lack of knowledge, the medical personnel is "authorized" because he or she may legitimately gain access through another arrangement. In one embodiment, the medical personnel is provided with an override security identifier. The override security identifier is, in general, any identifier that gains access to the system as an override to a user security identifier. In a preferred embodiment, an override security identifier is a username for a particular medical facility plus an override password for one or more personnel within the facility. Entry of the override security identifier into, e.g., a login web site allows entry into the secure system so that medical personnel can look up documents associated with, e.g., a medical patient (who is unable to tell the medical personnel directly his or her user name or number and user security identifier).

In another embodiment, a secure network interface is provided to the medical personnel by providing the medical personnel with a secure mechanism for looking up the user security identifier. For example, medical personnel may have security access (via a the override security identifier) to a secure site that allows the medical personnel to look up user security identifiers or other information according to, e.g., name. Having looked up a user security identifier for a particular patient, the medical personnel may then log onto the main system and access important documents such as that patient's medical directives.

In one embodiment, information from a user profile may be used to define the scope of medical personnel who can be access documents without having access to the user's security identifier. In such an embodiment, a user may define which type of medical practitioner or which specific medical facilities should be given access. For example, if patient X had indicated that nearby hospital Y should be given an override, medical personnel from hospital Y could access patient X's medical directives using hospital Y's override security identifier. If patient X had indicated otherwise, hospital Y could perhaps log onto the system but would be blocked before accessing the documents of patient X. In one embodiment, a default account condition for a user may be that any medical personnel should be given access, and a user may simply choose classes or categories of medical personnel who should be denied override access. Such embodiments provide great flexibility for the user and an ability to, if desired, to totally block access to important documents-even from medical personnel such as emergency care givers.

In one embodiment, to aid in implementing step 108, one may make proposals to emergency response departments in one or more U. S. cities or other locations to bring them "on-line" in relying on the services and techniques described here as a standard source for obtaining official data on victims and patients in a full range of emergency response situations. The following example scenario provides an example:

John Doe, traveling some 300 miles away from home, is involved in a life-threatening accident fifty miles from the nearest trauma center. Though he has an out-of-hospital "do not resuscitate" order in his safety deposit box in his hometown bank, EMS personnel are required by law to assume that no document exists until they are presented with a copy of it. The result: Mr. Doe is hospitalized in ICU on a respirator in direct opposition to his wishes. Had the EMS dispatcher been able to check a storage system as detailed here, he/she would have been able to have the document in hand in seconds, thus faithfully executing Mr. Doe's wishes.

Figure 2:
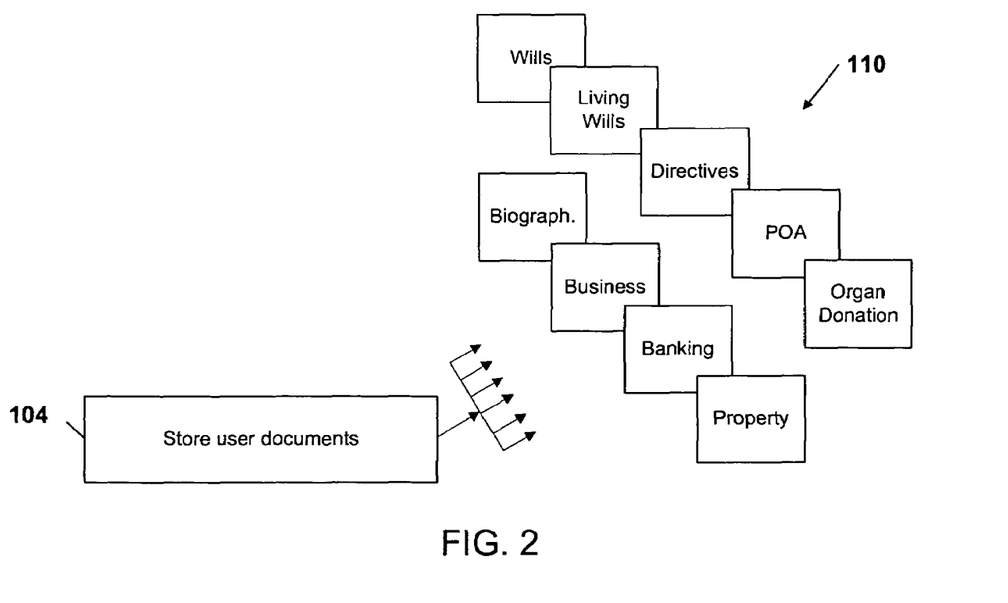
FIG. 2 is a flowchart showing a portion of an example method in accordance with embodiments of the present disclosure.

FIG. 2 is a flowchart showing example documents that may be stored in conjunction with step 104 of FIG. 1. Shown are biographical documents, business documents, banking documents, property documents, wills, living wills, directives, powers of attorney, and organ donation documents. One or more of these example documents may deal with disposing of property after death (e.g., wills) and/or effecting user medical decisions (e.g., living wills, directives, powers of attorney). Those having ordinary skill in the art will recognize that any type of document capable of electronic storage may be stored in step 104. For example, documents concerning funeral wishes or more general requests or wishes may be stored. Stored documents may be of any suitable format known in the art such as, but not limited to, text, pdf, gif, jpg, tiff, MS WORD, WORDPERFECT, or the like. Documents may run the gamut of legal consequence running from, e.g., signed legally binding documents all the way to user-entered informal notes.

Figure 3:
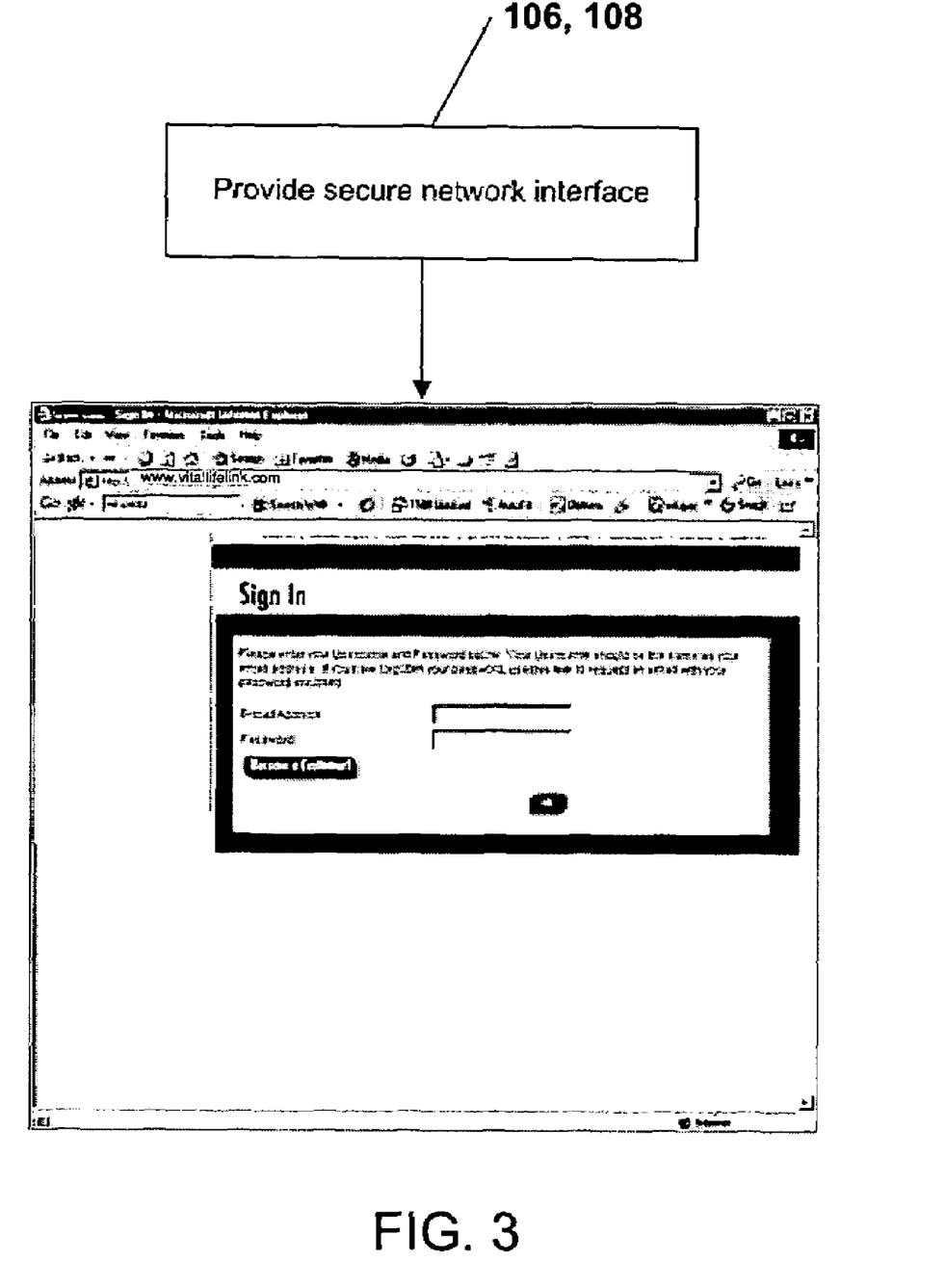
FIG. 3 is a flowchart showing a portion of an example method in accordance with embodiments of the present disclosure.

FIG. 3 is a flowchart showing an example secure network interface in the form of an Internet browser directed to a particular web page. In this embodiment, the interface is asking a user to log on by entering a user security identifier, which here includes an e-mail address and password.

Figure 4:
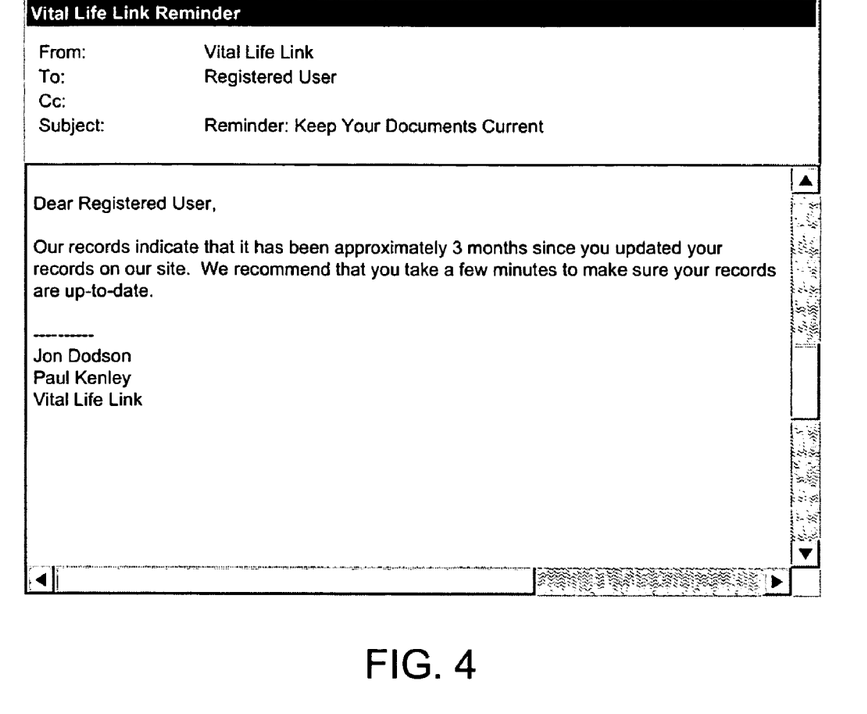
FIG. 4 is a schematic diagram of a reminder, in accordance with embodiments of the present disclosure.

FIG. 4 is a schematic diagram of a generic reminder or alert, which illustrates example ways in which an account using the techniques of this disclosure may be supplemented to provide even further assistance to its users. In this embodiment, a user is sent a message reminding him or her to make sure the stored documents are up-to-date. This type of message may be particularly helpful to users who have a will or medical directive being stored because it may prompt them at least once or on a more regular basis to consider whether any of their wishes have changed since the document was put into electronic storage.

The content of messages or alerts may vary widely. In one embodiment, the messages or alerts may be tailored to particular users. For instance, upon storage of documents, a user may be asked to identify, generally, what type of document it is (without revealing confidential information). For example, a user may store a will on a network server and click a radio-style button after the file transfer to indicate that the document was a will. The system, in turn, may include subject matter within a reminder or alert that is particularly well-suited for individuals with a will. For example, such a user may be sent alerts concerning any changes in law having to do with wills and estates or, more generally, alerts concerning news, developments, or advice about any end-of-life issue. Users who have stored financial documents may receive information concerning investment options, etc. Users may be sent targeted advertising, which in one embodiment, may result in a lower subscription rate (or render the account a "free" account).

Figure 5:
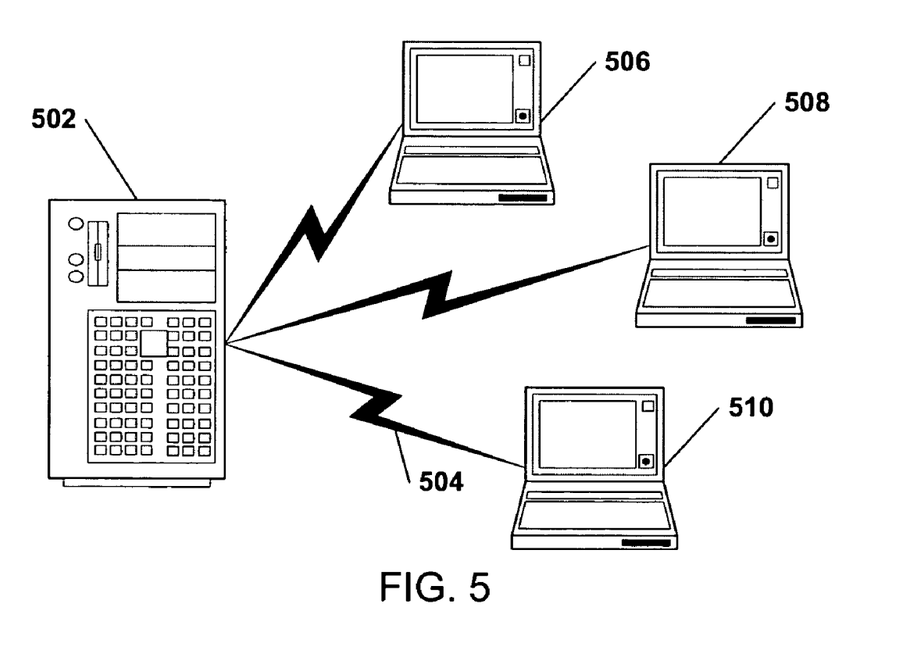
FIG. 5 is a schematic diagram of a system, in accordance with embodiments of the present disclosure.

FIG. 5 is a schematic diagram of a system configured to carry out embodiments of this disclosure. Network server 502 is coupled to computing devices 506. In the illustrated embodiment, the connection is meant to signify a wireless Internet connection. In other embodiments, any type of connection known in the art may be used including, but not limited to, wired and wireless connections. Network server 502 may be any type of computing device known in the art having a processor suitable for carrying out instructions for implementing the functionality described herein. Computing devices 506 may be, e.g., personal computers, laptops, PDA's, cell phones, terminals, etc. The system of FIG. 5 may be configured so that computing devices 506 are required to run special viewing or access software, or the computing devices may be able to simply use an Internet browser or the like for document storage applications.

Conveniently, and advantageously, if the network connecting computing devices 506 and network server 502 is the Internet, a user or medical personnel may be provided instant, or near-instant access, to a virtually unlimited amount of important information without having to physically carry anything. The inventors believe that the ability to always have a will or medical directive handy for oneself or for medical personnel will greatly improve the current state of the art and provide users with a greater sense of reassurance.

The invention claimed is:

1. A method comprising:
    registering a user for securely storing documents on a network;
    storing user documents on a network server, the user documents comprising documents for disposing of user property after death or for effecting user medical decisions;
    providing a secure network interface for displaying the user documents remotely upon receiving a user security identifier; and
    providing the secure network interface for displaying the user documents remotely to authorized medical personnel who do not have access to the user security identifier, wherein the secure network interface is provided to medical personnel with an override security identifier.

2. The method of claim 1, where the user documents comprise documents selected from the group consisting of:

wills, living wills, medical directives, powers of attorney, organ donation documents, and documents reflecting the location or nature of user property to be disposed of after death.

3. The method of claim 2, where the user documents reflect personal biographical data, business data, banking data, or user property data.

4. The method of claim 1, where the network server comprises an internet server, and the secure network interface comprises an internet browser.

5. The method of claim 1, where the user security identifier comprises a password.

6. The method of claim 1, where the user security identifier comprises biometric information.

7. The method of claim 6, where the biometric information comprises information selected from the group consisting of: fingerprint information, retina information, voice information, face information, and handwriting information.

8. The method of claim 1, where providing a secure network interface for displaying the user documents remotely to authorized medical personnel comprises providing the medical personnel with a secure mechanism for looking up the user security identifier.

9. The method of claim 1, further comprising providing the user with periodic alerts reminding the user to update or confirm information reflected in the user documents.

10. The method of claim 9, further comprising providing the user with periodic alerts concerning news, developments, or advice about end-of-life issues.

11. The method of claim 1, further comprising:
storing informal user comments for disposing of user property after death or for effecting user medical decisions;
providing the secure network interface for displaying the user comments remotely upon receiving a user security identifier; and
providing the secure network interface for displaying the user comments remotely to authorized medical personnel who do not have access to the user security identifier.

12. The method of claim 1, further comprising providing a printout of the user documents to the authorized medical personnel.

13. The method of claim 12, the printout comprising a certification including information selected from the group consisting of: printing date, printing time, printing location, user identifier, printing party identifier, and server identifier.

14. The method of claim 1, where information is encrypted as a security measure.

15. A computer readable media comprising computer executable instructions which:
register a user for securely storing documents on a network;
store user documents on a network server, the user documents comprising documents for disposing of user property after death or for effecting user medical decisions;
interact with a secure network interface for displaying the user documents remotely upon receiving a user security identifier; and
interact with the secure network interface for displaying the user documents remotely to authorized medical personnel who do not have access to the user security identifier, wherein the secure network interface is provided to medical personnel with an override security identifier.

16. The media of claim 15, further comprising instructions for providing the user with periodic alerts reminding the user to update or confirm information reflected in the user documents.

17. The media of claim 16, further comprising instructions for providing the user with periodic alerts concerning news, developments, or advice about end-of-life issues.

18. The media of claim 15, further comprising instructions for encrypting information as a security measure.

19. A system comprising:
a network server having a processor configured to:
register a user for securely storing documents on a network;
store user documents on a network server, the user documents comprising documents for disposing of user property after death or for effecting user medical decisions;
interact with a secure network interface for displaying the user documents remotely upon receiving a user security identifier; and
interact with the secure network interface for displaying the user documents remotely to authorized medical personnel who do not have access to the user security identifier, wherein the secure network interface is provided to medical personnel with an override security identifier.

* * * * *